United States Patent
Purohit

(10) Patent No.: US 10,104,596 B2
(45) Date of Patent: Oct. 16, 2018

(54) BORDER ROUTER OF A WIRELESS MESH NETWORK EXTENDING CONNECTIVITY OF WIRELESS STATIONS TO EXTERNAL NETWORKS

(71) Applicant: GainSpan Corporation, San Jose, TX (US)

(72) Inventor: Sibasis Purohit, Bangalore (IN)

(73) Assignee: GainSpan Corporation, San Jose, CA (US)

(*) Notice: Subject to any disclaimer, the term of this patent is extended or adjusted under 35 U.S.C. 154(b) by 74 days.

(21) Appl. No.: 15/220,419

(22) Filed: Jul. 27, 2016

(65) Prior Publication Data

US 2018/0035352 A1    Feb. 1, 2018

(51) Int. Cl.
| | | |
|---|---|---|
| *H04W 4/00* | (2018.01) | |
| *H04W 40/02* | (2009.01) | |
| *H04W 88/10* | (2009.01) | |
| *H04W 80/04* | (2009.01) | |

(52) U.S. Cl.
CPC .......... *H04W 40/02* (2013.01); *H04W 80/045* (2013.01); *H04W 88/10* (2013.01)

(58) Field of Classification Search
CPC .... H04W 40/02; H04W 80/045; H04W 88/10
See application file for complete search history.

(56) References Cited

U.S. PATENT DOCUMENTS

| | | | |
|---|---|---|---|
| 8,509,202 B2 | 8/2013 | Wang et al. | |
| 8,830,847 B1* | 9/2014 | Doherty | H04W 40/12 370/252 |
| 2010/0279672 A1* | 11/2010 | Koskela | H04W 36/30 455/418 |
| 2012/0300648 A1* | 11/2012 | Yang | H04L 43/0835 370/252 |

(Continued)

FOREIGN PATENT DOCUMENTS

| | | |
|---|---|---|
| CN | 101340404 A | 1/2009 |
| CN | 203167301 U | 8/2013 |
| CN | 103841667 A | 6/2014 |

OTHER PUBLICATIONS

Wifi/ ZigBee Chip Eases IoT Implementation, http://electronicdesign.com/communications/wi-fizigbee-chip-eases-iot- implementation, Downloaded circa Jun. 15, 2016, pp. 1-3.

(Continued)

*Primary Examiner* — Abdelnabi O Musa
(74) *Attorney, Agent, or Firm* — Pearl Cohen Zedek Latzer Baratz LLP

(57) ABSTRACT

A wireless device receives a sequence of packets in a first set of durations on a first wireless network according to a first wireless protocol. The border router forwards the received sequence of packets in a second set of durations on a second wireless network according to a second wireless protocol. None of the first set of durations overlaps with any of the second set of durations. The first set of durations and the second set of durations are realized according to time (Continued)

division multiplexing. The sequence of packets are received and forwarded by the wireless device using a shared transceiver. In an embodiment, the wireless device is a border router of a wireless mesh network, and the first wireless protocol and the second wireless protocol are respectively according IEEE 802.15.4 and IEEE 802.11.

11 Claims, 8 Drawing Sheets

(56) References Cited

U.S. PATENT DOCUMENTS

2014/0123199 A1* 5/2014 Kim .................. H04N 21/6175
725/110

OTHER PUBLICATIONS

GS2000 Based Module Software Developer Kit (SDK) Builder User Guide, Release 2.5, Oct. 13, 2015, pp. 1-154.
Single-Site Programmer for GS2000-Based Modules, http://www.gainspan.com/products/single_programmers, Downloaded circa Jun. 15, 2016, pp. 1-2.
Atmel AT2200, http://www.atmel.com/images/atmel-32199-zigbee-to-ethernet-and-wifi-dateway-kit-hardware-user_appnote_at2200.pdf , Downloaded circa Jun. 15, 2016. pp. 1-15.
NXP mBed Thread Solution, http://www.nxp.com/wcm_documents/techzones/microcontrollers-techzone/Presentations/ARMTechCon2015_mbedThread.pdf, Downloaded circa Jun. 15, 2016, pp. 1-41.
RS9113 Connect-io-n™ Module Family, http://www.redpinesignals.com/Modules/Internet_of_Things/Connection_Family/RS9113.php, Downloaded circa Jun. 15, 2016, pp. 1-3.
A Design of 6LoWPAN Routing Protocol Border Router with Interface: 802.15.4, https://www.researchgate.net/publication/277151963_A_Design_of_6LoWPAN_Routing_Protocol_Border_Router_with_Interface_802154 , Downloaded circa Jun. 15, 2016, pp. 1-3.
ZigBee IP Specification, ZigBee Public Document 13-002r00, Feb. 2013, pp. 1-86.
Drew Gislason, ZigBee applications—Part 1: Sending and receiving data, date Jul. 2, 2010, pp. 1-7.

* cited by examiner

BORDER ROUTER OF A WIRELESS MESH NETWORK EXTENDING CONNECTIVITY OF WIRELESS STATIONS TO EXTERNAL NETWORKS

BACKGROUND

Technical Field

Embodiments of the present disclosure relate generally to wireless networks, and more specifically to a border router of a wireless mesh network for extending connectivity of wireless stations to external networks.

Related Art

A wireless mesh network refers to a set of routers connecting wireless stations. Wireless stations are end devices that are the source or (final) destination of data packets, while the routers provide the switching function to receive packets from source wireless stations and deliver them to the respective destination wireless stations. Some of the devices of the wireless mesh network may operate as both router and wireless station.

Border routers are a class of routers which are at the edge of the wireless mesh network in the connectivity path, and operate to extend the connectivity (by corresponding switching function of the data packets) of wireless stations to external networks such as Internet using Internet Protocol (IP). Aspects of the present disclosure are directed to border routers of such wireless mesh networks which extend connectivity of wireless stations to external networks.

BRIEF DESCRIPTION OF THE VIEWS OF DRAWINGS

Example embodiments of the present disclosure will be described with reference to the accompanying drawings briefly described below.

In the drawings, like reference numbers generally indicate identical, functionally similar, and/or structurally similar elements. The drawing in which an element first appears is indicated by the leftmost digit(s) in the corresponding reference number.

DETAILED DESCRIPTION

1. Overview

A wireless device receives a sequence of packets in a first set of durations on a first wireless network according to a first wireless protocol. The wireless device (operating as a switch at the border of the first wireless network) forwards the received sequence of packets in a second set of durations on a second wireless network according to a second wireless protocol. None of the first set of durations overlaps with any of the second set of durations. The first set of durations and the second set of durations are realized according to time division multiplexing. The sequence of packets are received and forwarded by the wireless device using a shared transceiver.

In an embodiment, the wireless device is a border router of a wireless mesh network, and the first wireless protocol and the second wireless protocol are respectively according IEEE 802.15.4 and IEEE 802.11. The border router operates as an IEEE 802.15.4 coordinator in the first set of durations, and as an IEEE 802.11 wireless station (STA) in the second set of durations.

In an embodiment, only the first level of the wireless mesh network according to IEEE 802.15.4 operates in a beacon-enabled network mode, while the lower levels operate in the beaconless network mode. The border router signals transitions between operating modes (as a coordinator and STA) to its child nodes in the wireless mesh network implicitly using beacons.

In another embodiment, all levels of the wireless mesh network according to IEEE 802.15.4 operate in the beaconless network mode. The border router signals transitions between operating modes (as a coordinator and STA) to its child nodes in the wireless mesh network using data embedded in payload of layer-4 packets (e.g., as UDP payload).

Several aspects of the invention are described below with reference to examples for illustration. It should be understood that numerous specific details, relationships, and methods are set forth to provide a full understanding of the invention. One skilled in the relevant arts, however, will readily recognize that the invention can be practiced without one or more of the specific details, or with other methods, etc. In other instances, well-known structures or operations are not shown in detail to avoid obscuring the features of the invention.

2. Example Environment

Figure 1:
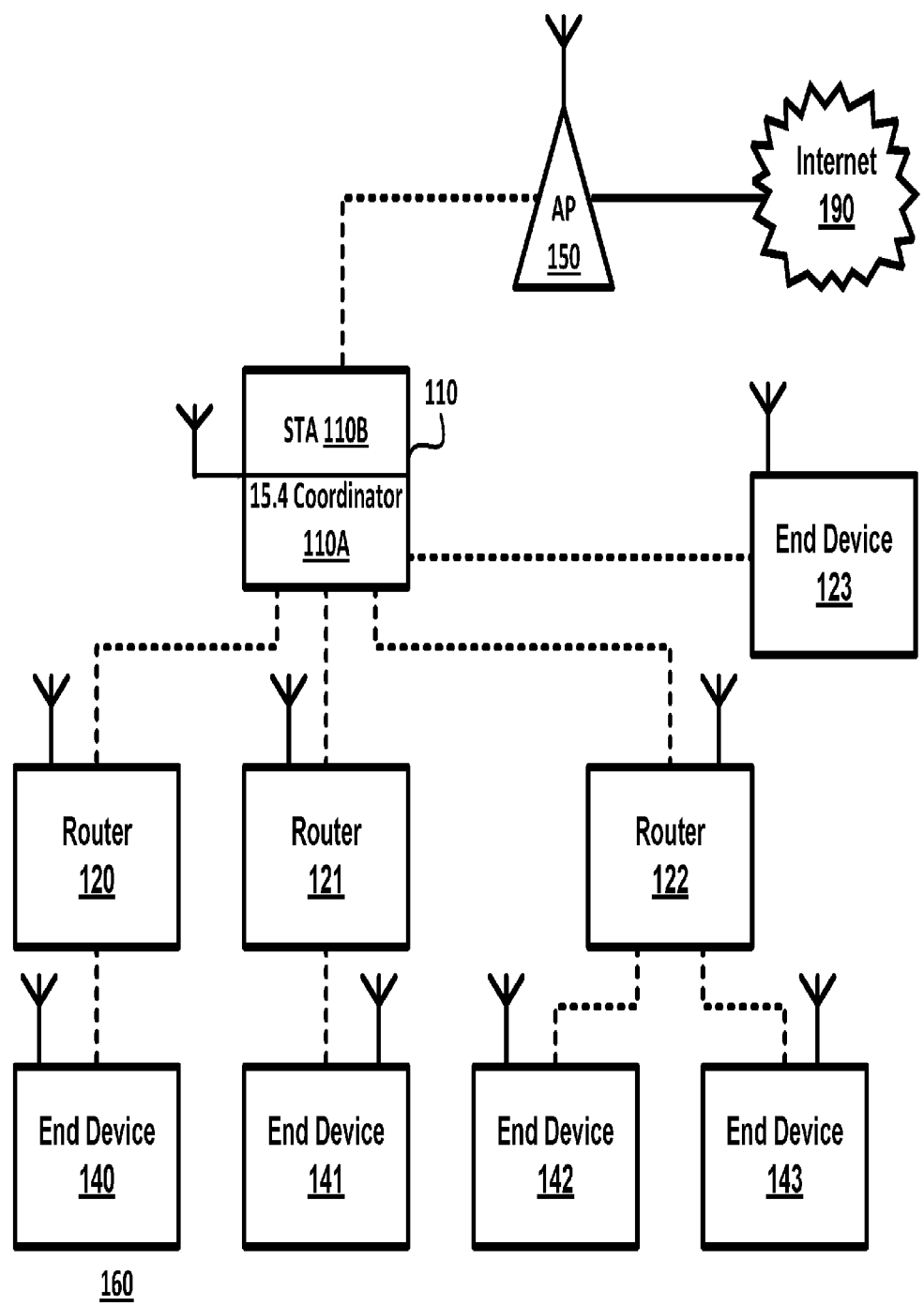
FIG. 1 is a block diagram of an example environment in which several aspects of the present disclosure can be implemented.

FIG. 1 is a block diagram representing an example environment in which several aspects of the present disclosure can be implemented. The example environment is shown containing only representative devices and systems for illustration. However, real world environments may contain more or fewer systems/devices. FIG. 1 is shown containing wireless device 110, wireless routers (routers) 120, 121, and 122, end devices 140, 141, 142, 143 and 123, access point (AP 150) and internet 190. The corresponding wireless devices are each shown to contain an antenna, although not numbered.

Wireless device 110 represents a border router (border router 110) of wireless mesh network 160 (described below), and is implemented to include an integrated circuit (IC)

containing the physical layer and medium access layer (MAC) circuitry for each of IEEE 802.15.4 and IEEE 802.11 (WiFi) operations. As well known in the relevant arts, IEEE 802.15.4 specifies a communication range of the order of a few tens of meters, while IEEE 802.11 specifies a comparatively longer communication range of the order of a few hundreds of meters.

Thus, border router 110 is shown in FIG. 1 as being operable as a wireless station (STA 110B) according to IEEE 802.11, as well as a coordinator (coordinator 110A) according to IEEE 802.15.4. Border router 110 is implemented to contain only a single RF chain (transceiver), and therefore operation as STA 110B and coordinator 110A is achieved by time division multiplexing between the two operations. STA 110B is associated with AP 150, and the combination of STA 110B and AP 150 represents a wireless local area network (WLAN, also termed WiFi) (second wireless network) formed and operated according to IEEE 802.11 standards. The dotted line shown connecting STA 110B and AP 150 represents a wireless connection. Border router 110 may receive a packet from an end device for delivery to another end device within mesh 160, and may forward the packets appropriately to a corresponding router or the end device itself if the end device is a child node of border router 110A.

Each of wireless routers 120, 121 and 122, and wireless end devices 140, 141, 142, 143 and 123 is designed to operate as an IEEE 802.15.4-capable device (at layer-2). As well known in the relevant arts, IEEE 802.15.4 specifies a communication range of the order of a few tens of meters. The combination of wireless routers 120, 121 and 122, wireless end devices 140, 141, 142, 143 and 123 and border router 110 together represents a wireless mesh network (160) (first wireless network), which operates according to the IEEE 802.15.4 specification at layer 1 (physical layer) and layer 2 (data link layer), and according to Zigbee-IP or Thread specifications at the layers above layer 2.

Wireless mesh network 160 (which represents a wireless personal area network or WPAN) may be formed and operated according to any of well known protocols operating above layer-2 protocol. The hierarchical relationship between a parent node and a child node in wireless mesh network (mesh) 160 is represented in FIG. 1 by dashed lines. Thus, border router 110A is at the root of the hierarchy, with routers 120-122 and end device 123 as its child nodes. End device 140 is a child node of router 120. End device 141 is a child node of router 121. End devices 142 and 143 are child nodes of router 122.

Each of end devices 140-143 and 123 is a wireless device that may be designed to perform one or more of corresponding operations, and may execute corresponding user applications. The user applications in the end devices may generate data values which may be then be transmitted by the end devices to another end device in wireless mesh network 160 (and routed via corresponding routers 120-122 and/or border router 110A), or to a device in internet 190 (routed via the respective routers 120-122, border router 110A and AP 150). A device (or node) in internet 190 refers to a node that is outside of the WLAN network formed by STA 110B and AP 150.

Similarly, one or more of end devices 140-143 and 123 may receive packets from a device in internet 190 (via the corresponding ones of routers 120-122, border router 110A and AP 150), or from another end device (via the corresponding ones of routers 120-122, and border router 110A). Routers 120-122, in addition to performing routing operations, may also be the source or destination of packets, and may transmit and/or receive packets from/to other routers and end devices.

Internet 190 extends the connectivity of the devices in wireless mesh network 160 to various systems (not shown) connected to, or part of, internet 190. Internet 190 may be implemented using protocols such as IP. In general, in IP environments, an IP packet is used as a basic unit of transport, with the source address being set to the IP address assigned to the source system from which the packet originates and the destination address set to the IP address of the destination system to which the packet is to be eventually delivered. The IP packet is encapsulated in the payload of layer-2 packets when being transported across wireless mesh network 160.

An IP packet is said to be directed to a destination system when the destination IP address of the packet is set to the IP address of the destination system, such that the packet is eventually delivered to the destination system. When the packet contains content such as port numbers, which specifies the destination application, the packet may be said to be directed to such application as well. The destination system may be required to keep the corresponding port numbers available/open, and process the packets with the corresponding destination ports.

The manner in which device 110 operates to forward packets from/to devices in mesh 160 to/from devices in internet 190 is described next with respect to a flowchart.

3. Operations as Border Router

Figure 2:
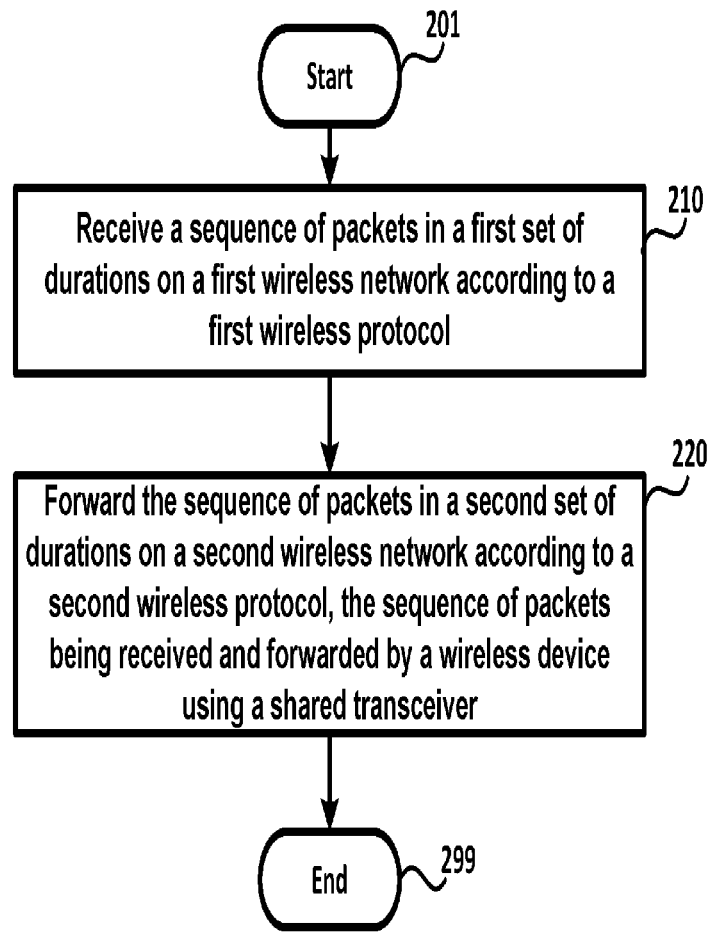
FIG. 2 is a flowchart illustrating operations performed by a border router of a wireless mesh network, in an embodiment of the present disclosure.

FIG. 2 is a flowchart illustrating the manner in which a border router of wireless mesh network enables exchange of packets between devices in the mesh network and devices in an external network such as internet. The flowchart is described with respect to the environment of FIG. 1, and in relation to border router 110, merely for illustration. However, various features described herein can be implemented in other environments and using other components as well, as will be apparent to one skilled in the relevant arts by reading the disclosure provided herein. Further, the steps in the flowchart are described in a specific sequence merely for illustration. Alternative embodiments using a different sequence of steps can also be implemented without departing from the scope and spirit of several aspects of the present invention, as will be apparent to one skilled in the relevant arts by reading the disclosure provided herein. The flowchart starts in step 201, in which control passes immediately to step 210.

In step 210, border router 110, operating as coordinator 110A, receives a sequence of packets in a first set of durations on a first wireless network according to a first wireless protocol. It should be appreciated that wireless protocols refer to protocols which provide for basic functions enabling many systems to share the wireless medium for transmissions and reception of packets. In the environment of FIG. 1, the first wireless network is wireless mesh network 160, and the first wireless protocol is according to IEEE 802.15.4 standard. Control then passes to step 220.

In step 220, border router 110, operating as STA 110B, forwards the sequence of packets (received in step 210) in a second set of durations on a second wireless network according to a second wireless protocol (which is different from the first wireless protocol noted above). In the environment of FIG. 1, the second wireless network is the WLAN network formed by STA 110B and AP 150, and the second wireless protocol is according to IEEE 802.11 standard (including all amendments and revisions of that standard). Control then passes to step 299, in which the flowchart ends.

Thus, border router 110, when operating as coordinator 110A, may store packets received from devices in wireless mesh network 160, and transmit the packets to the corresponding device in internet 190 when operating as STA 110B (via AP 150). When operating as STA 110B, border router 110 may receive packets from devices in internet 190 (and via AP 150), store the received packets, and transmit the stored packets to the corresponding device in mesh 160 when operating as coordinator 110A.

Since border router 110 is designed using a single RF chain, the operations noted above, including those of step 210 and step 220, are performed by border router 110 in non-overlapping durations using TDM. Such TDM operation may pose some challenges. For example, the devices in mesh 160 may expect border router 110 (operating as coordinator 110A) to be always present and capable of receiving packets from the devices, and forwarding packets to the devices. Therefore, the TDM operation requires that some mechanism be available for signaling the availability and non-availability, as well as the corresponding durations of availability/non-availability of border router 110 to one or more devices in mesh 160. The manner in which such signaling is provided by border router 110 to one or more devices in mesh 160 is described next.

4. Beacon-Enabled Network at First Level of Mesh

In an embodiment of the present disclosure, the topmost level (termed first level herein) of mesh 160 is designed to operate in a beacon-enabled mode, while the other lower levels are designed to operate in a beaconless mode. With respect to FIG. 1, the first level of the mesh 160 is the set of nodes containing the root node (border router 110) and its child nodes (routers 120, 121 and 122, and end device 123). The next (lower) level (second level) is the set of nodes containing the child nodes of border router 110 and their child nodes (namely end devices 140, 141, 142 and 143), and so on.

As noted above the first level of nodes in mesh 160 operate in a beacon-enabled mode. Accordingly, border router 110, operating as coordinator 110A, is designed to transmit beacons at regular intervals, as further illustrated below. Child nodes of border router 110 are designed to expect (and receive) beacons at regular intervals from border router 110, and also to synchronize their operations with respect to the beacons. The indication of availability and non-availability of coordinator 110A is implicit in the beacon-enabled first level, as described below.

Figure 3A:
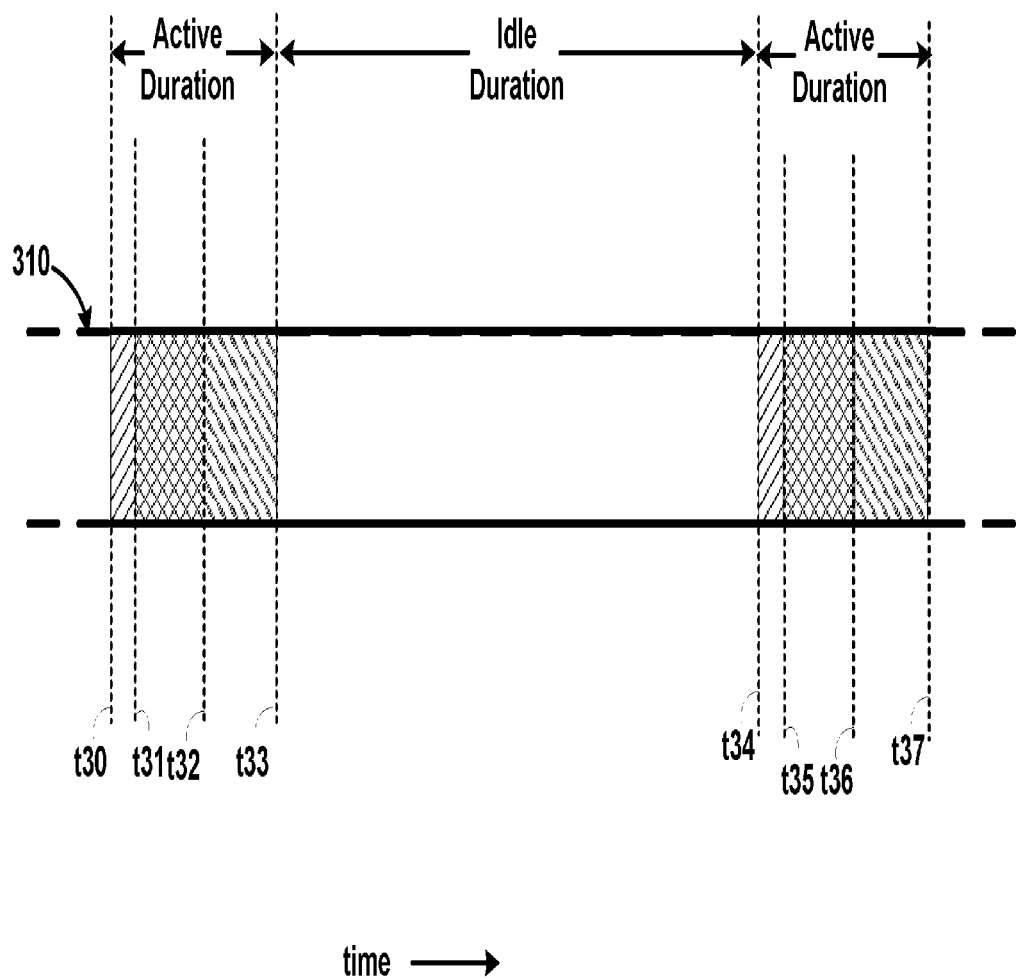
FIG. 3A is a timing diagram illustrating the operations of a border router when the first level of a wireless mesh network operates in a beacon-enabled network mode, in an embodiment of the present disclosure.

FIG. 3A is a timing diagram illustrating the operations of coordinator 110A in the beacon-enabled mode of the first level of mesh 160. Marker 310 indicates transmission and/or receptions of packets in the wireless medium accessed by the nodes at first level of mesh 160. In FIG. 3A, interval t30-t34 (time between commencement of successive beacons) represents one beacon interval (BI) in the beacon-enabled mode of operation according to IEEE 802.15.4, and is divided into an active duration (active part or "Superframe") and an idle duration (inactive part).

As is well known in the relevant arts, the IEEE 802.15.4 standard requires that all participating active/transmitting entities (nodes and coordinator included) of an IEEE 802.15.4 network refrain from transmission in the idle duration, and such idle duration can potentially be used by all the entities to operate in power-savings state (to reduce power consumption). The 802.15.4 standard specifies that the entities can transmit only in the active duration of a beacon interval in the beacon-enabled network mode of operation. Beacon-enabled network mode of operation is defined in section 3.1 (beacon-enabled personal area network (PAN)) of the IEEE 802.15.4 standard as a PAN in which all coordinators emit regular beacons. Beacon-enabled network mode is further described in section 4.5.2 and section 4.5.4.1 of the IEEE 802.15.4 standard.

In FIG. 3A, the active duration (t30-t33) is shown containing three intervals, namely t30-t31, t31-t32 and t32-t33. At t30, border router 110 commences operation as an IEEE 802.15.4 coordinator (110A), and transmits a beacon in interval t30-t31. The beacon may contain timing synchronization information (e.g., current time) as well as other information, such as configuration information, to enable child nodes routers 120-122 and end device 123 to communicate via coordinator 110A according to IEEE 802.15.4 standard.

Interval t31-t32 is a contention access period (CAP), in which routers 120-122, end device 123 and coordinator 110A contend for access to the wireless medium for transmitting data to, and receiving data from, coordinator 110A. The specific access mechanism may be according to CSMA-CA (Carrier Sense Multiple Access—with Collision Avoidance) as specified by the IEEE 802.15.4 standard. Once access is obtained to the wireless medium, the corresponding node(s) (namely routers 120-122, end device 123 and coordinator 110A) may communicate with another one of the nodes to exchange data and/or other control bits/frames.

Interval t32-t33 is a contention-free period (CFP) in which corresponding confirmed/dedicated time slots for communication between coordinator 110A and corresponding ones of routers 120-122 and end device 123 is provided. The number of such dedicated time slots within interval t32-t33 may be multiple, and which slot is meant for which specific one of routers 120-122 and end device 123 may be specified in the beacon (t30-t31) by coordinator 110A. The corresponding ones of routers 120-122 and end device 123 may exchange data packets with coordinator 140 in interval t32-t33 in their corresponding time slots.

At time instant t33, border router 110 switches to operation as STA 110B, and continues to operate as STA 110B till time instant t34. At time instant t34, border router 110 switches to operation as coordinator 110A, and another IEEE 802.15.4 beacon interval (BI) commences, with corresponding active durations and idle durations. The beacon, CAP and CFP durations of the next beacon interval are t34-t35, t35-t36 and t36-t37 respectively. The beacon intervals repeat, with border router 110 operating as coordinator 110A in the active durations of the beacon intervals, and as STA 110B in the idle durations of the beacon intervals. When operating as STA 110B, border router may forward packets from/to nodes in mesh 160 to/from devices in internet 190.

Since the duration of a beacon interval is fixed, and since the child nodes of border router 110 are synchronized to the beacons, indication of transition from operation as coordinator 110A to STA 110B and vice-versa is implicit. Thus, the beacons transmitted by coordinator 110A serve as signaling packets to signal the start of the active durations, and thus indicate to routers 120-122 and end device 123 the availability of coordinator 110A. Since the length of a beacon interval is fixed, routers 120-122 and end device 123 can calculate end of the active durations (t33 and t37 in FIG.

3A), and thus conclude that coordinator 110A will not be available for data exchange till the end of the corresponding idle duration.

During the CAP and CFP durations of an active duration of a beacon interval, one or more of routers 120-122 and end device 123 may transmit IP packets destined for devices in internet 190 to coordinator 110A. The source of such IP packets can be to routers 120-122 and end device 123 themselves, or any of the child nodes of routers 120-122. Coordinator 110A may store the received IP packets. Then, after border router 110 switches to STA mode, STA 110B forwards the stored IP packets via AP 150 to the corresponding destination device in internet 190. Similarly, STA 110B may receive, from devices in internet 190, IP packets destined for device(s) in mesh 160, and store such packets. After switching to operation as coordinator 110A, border router 110 transmits the IP packets to the corresponding destination during the corresponding CAP and/or CFP.

The IEEE 802.15.4 standard specifies a range of 15.36 milliseconds (ms) to 250 seconds (s) for an IEEE 802.15.4 beacon interval. The specific length of the beacon interval is programmable, and may be chosen based on specific considerations or requirements. For example, the typical WLAN beacon interval (interval at which beacons are transmitted by AP 150) is around 100 ms. Hence it may be desired to maintain the durations of the active durations to be less than 100 ms, thereby ensuring that STA 110B is operational to receive each beacon of AP 150. In general, it may be desirable to select the active duration to be less than the typical WLAN beacon interval. In an embodiment, IEEE 802.15.4 beacon interval is selected to be 500 ms, with each superframe duration being 50 ms, and each idle interval thus being 450 ms However, other values for active and inactive durations can also be used.

Figure 3B:
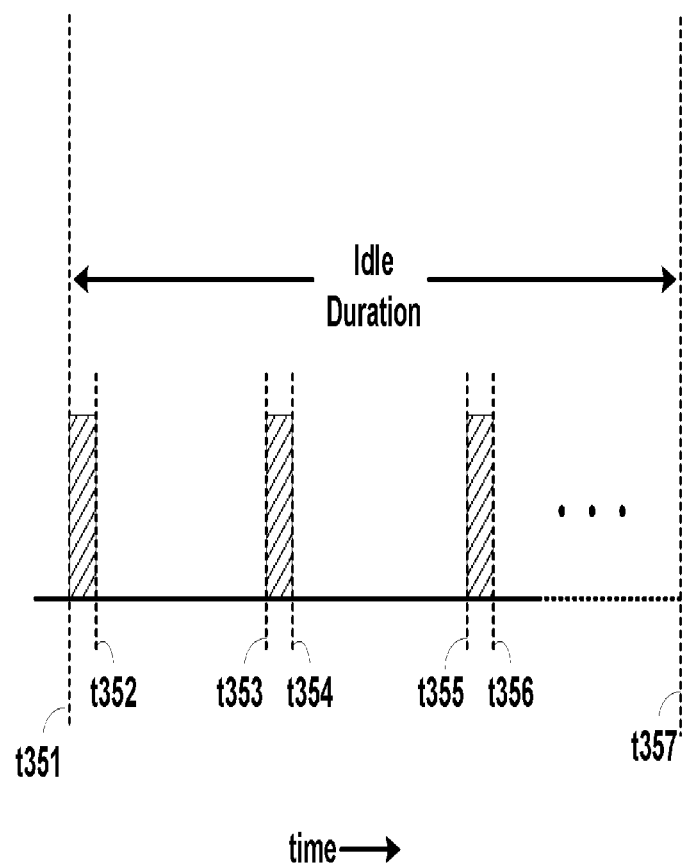
FIG. 3B is a timing diagram illustrating the operations of a border router when the border router operates as a wireless station according to IEEE 802.15.4 standard, in an embodiment of the present disclosure.

FIG. 3B shows a timing diagram illustrating the operations of STA 110B in idle durations of an IEEE 802.15.4 beacon interval, in an embodiment of the present disclosure. Time interval t351-t357 equals the idle duration of an IEEE 802.15.4 beacon interval. Time instant t351 corresponds to time instant t33 of FIG. 3, while time instant t357 corresponds to t34. Some beacon transmissions of AP 150 are represented by intervals t351-t352, t353-t354 and t355-t356 in FIG. 3B. STA 110B may forward/receive data packets to/from AP 150 in intervals t352-t53, t354-t55 and t356-t57.

The specific timing (duration, start and stop instants, length of active and idle durations, etc.) of an IEEE 802.15.4 beacon interval are effected by software instructions (operating in combination with corresponding hardware blocks) executed in border router 110, as described in greater detail in sections below.

The second level of mesh 160 operates in the beaconless network mode. Thus, none of routers 120, 121 and 122 transmits any beacons. Instead, if any of end devices 140-143 needs to transmit data to another node in mesh 160 or to a device in internet 190, the corresponding end device contends for access to the wireless medium according to IEEE 802.15.4 medium access rules. On obtaining access to the wireless medium, the end device transmits one or more IP packets to the desired destination device. Similarly, routers 120-122 may also contend for the wireless medium, and on obtaining access to the wireless medium transmit IP packets to the corresponding one of end devices 140-143. Further lower levels (not shown, but if present) of mesh 160 would also operate in the beaconless mode.

In another embodiment of the present disclosure, all the nodes in mesh 160 operate in the beaconless network mode, as described next.

5. Beaconless Network Mode

In the beaconless network mode, none of border router 110 and routers 120-122 ever transmits any beacons. For transmission of packets, each node in mesh 160 (including coordinator 110A) must contend for and obtain access to the wireless medium, and then transmit the packet(s). The MAC-level operations in the beaconless network mode are described in section 5.2 of ZigBee-IP Specification (ZigBee Public Document 13-002r00, February 2013) published by the Zigbee alliance, and also in Section 3.2 of the Thread 1.0 Specification.

Figure 4:
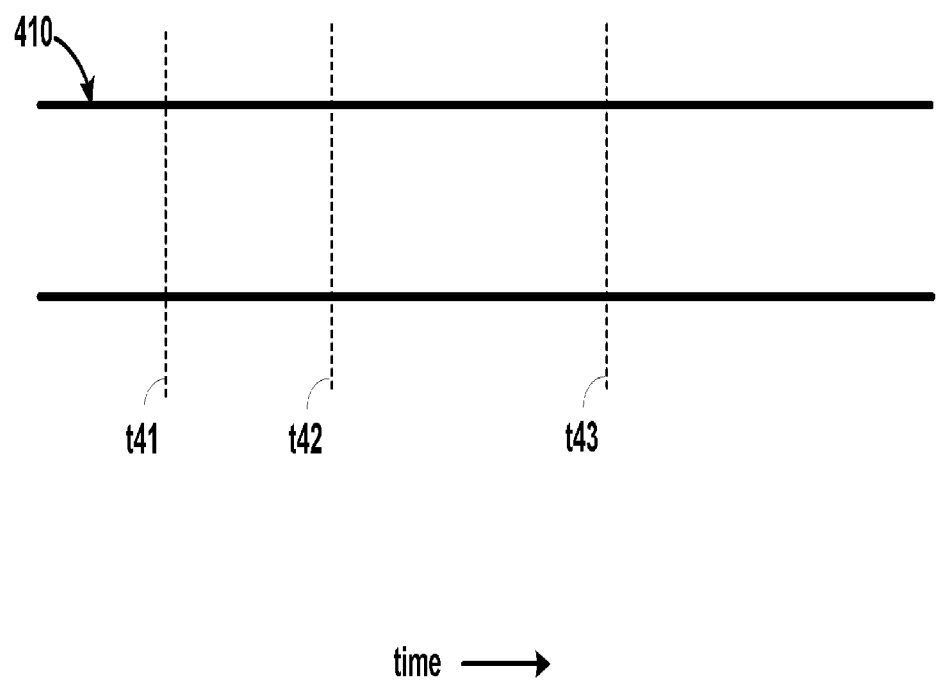
FIG. 4 is a timing diagram illustrating the operations of a border router when all levels of a wireless mesh network operate in a beaconless network mode, in an embodiment of the present disclosure

In the embodiment, border router 110 transmits a layer-4 packet which serves as signaling packet to signal to its child nodes (routers 120-122 and end device 123) its transition from operation as coordinator 110A to STA 110B, as well as from STA 110B to coordinator 110A. FIG. 4 is an example timing diagram illustrating signaling by border router 110 to indicate such transitions.

Marker 410 indicates transmission and/or receptions of packets in the wireless medium accessed by nodes in the first level of mesh 160. Border router 110 is assumed to operate as STA 110B immediately prior to time instant t41. At t41, border router 110A switches to operate as coordinator 110A. At, or slightly after t41, coordinator 110A broadcasts a layer-4 User Datagram Protocol (UDP) packet indicating that border router 110 has commenced operation as coordinator 110A. The UDP packet indicates to routers 120-122 and end device 123 that border router 110, operating as coordinator 110A, is available for receiving packets from its child nodes, and also for transmitting packets to its child nodes. Border router 110 operates as coordinator 110A till time instant t42. Thus, routers 120-122 and end device 123 can transmit IP packets to border router 110 (for forwarding to the corresponding destination device internal or external to mesh 160), and can also receive packets (originating from other devices internal or external to mesh 160) from border router 110 in the duration t41-t42. Coordinator 110A stores any received packets for forwarding on internet 190 in a memory that is accessible to STA 110B also. The interval t41-t42 may also be viewed as representing an 'active duration' in which border router 110 operates as an IEEE 802.15.4 coordinator.

At t42, border router 110, operating as coordinator 110A, broadcasts another layer-4 UDP packet indicating that border router 110 is to transition to operating as STA 110B. The UDP packet indicates to child nodes routers 120-122 and end device 123 of border router 110 that border router 110 will not be available (starting at t42) for receiving packets from, or transmitting packets to, its child nodes. At, or slightly after t42, border router 110 commences operation as STA 110B and continues operating as STA 110B until time instant t43. In duration t42-t43, STA 110B forwards packets stored earlier for forwarding to destination devices in internet 190. STA 110B also stores packets received from device (s) in internet 190 destined to devices(s) in mesh 160. The interval t42-t43 may also be viewed as representing an 'inactive duration' in which border router 110 does not operate as an IEEE 802.15.4 coordinator, but operates instead as a wireless station according to IEEE 802.11.

At t43, border router 110 switches to operation as coordinator 110A, and broadcasts another UDP packet signaling that border router 110 is now operating as coordinator 110A. The operations noted above may repeat. The durations of operation as coordinator 110A and STA 110B need not be equal or remain the same across, and thus the transition from coordinator 110A to STA 110B and vice versa can, in general, be non-periodic. In an embodiment, the transitions from coordinator 110A to STA 110B and vice versa are such as to ensure that STA 110B is operational to receive each beacon of AP 150.

The operation of the second level of mesh 160 in the beaconless network mode is similar or identical to that described above with respect to the beacon-enabled network, and is not repeated again in the interest of conciseness.

Figure 5:
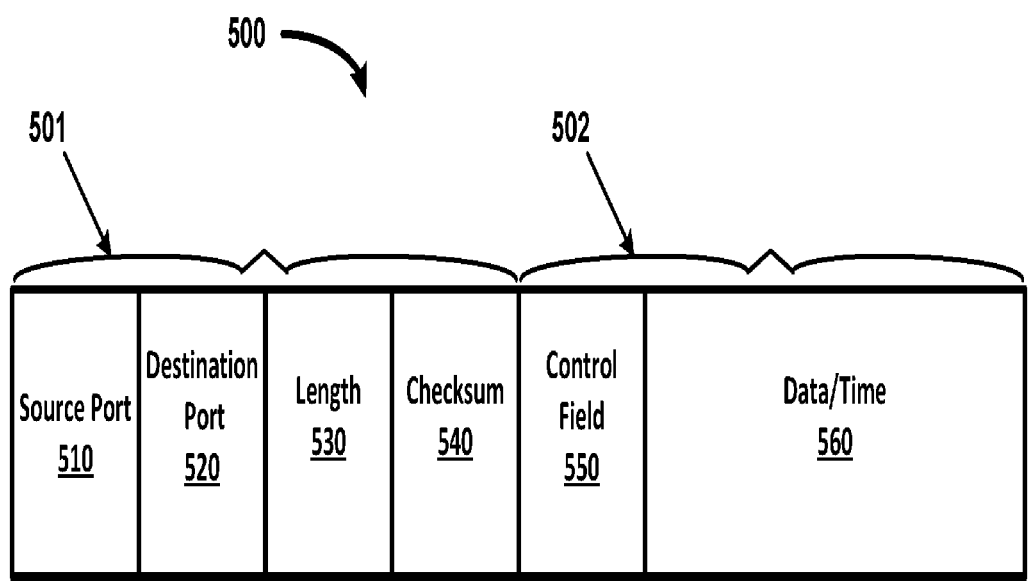
FIG. 5 is a diagram illustrating the various fields in a layer-4 packet transmitted by a border router, in an embodiment of the present disclosure.

FIG. 5 is a diagram illustrating the format of a UDP packet 500 that is used by border router 110 to signal to its child nodes transitions to operation as STA 110B, and for signaling commencement of operation as coordinator 110A. UDP packet 100 is shown containing UDP header 501 and UDP payload 502. UDP header 501 is shown containing fields 510, 520, 530 and 540, while UDP payload 502 is shown containing 550 and 560.

Source port 510 and destination port 520 respectively contain the number of the source port and destination ports associated with packet 500. Length 530 contains the length of packet 500 in terms of number of bytes.

Control field 550 contains a bit which defines the meaning of data/time field 560. If the bit is a logic zero, then field 560 contains data sought to be transmitted. If the bit is a logic one, then field 560 contains a time value. The time value indicates either the time instant at which border router 110 is to transition to operation as STA 110B, or the instant at which border router commences operation as coordinator 110A. Thus, with respect to FIG. 4, the time/data field 560 of the UDP packet transmitted by coordinator 110A at t41, would contain a value indicating the time at t41. The time/data field 560 of the UDP packet transmitted by coordinator 110A at t42, would contain a value indicating the duration of the interval t42-t43. However, other conventions can be used to indicate the availability/non-availability durations. In an embodiment, the time value is encoded to be in seconds.

The description is continued with respect to an illustration of the internal details of border router 110 in an embodiment.

6. Border Router

Figure 6:
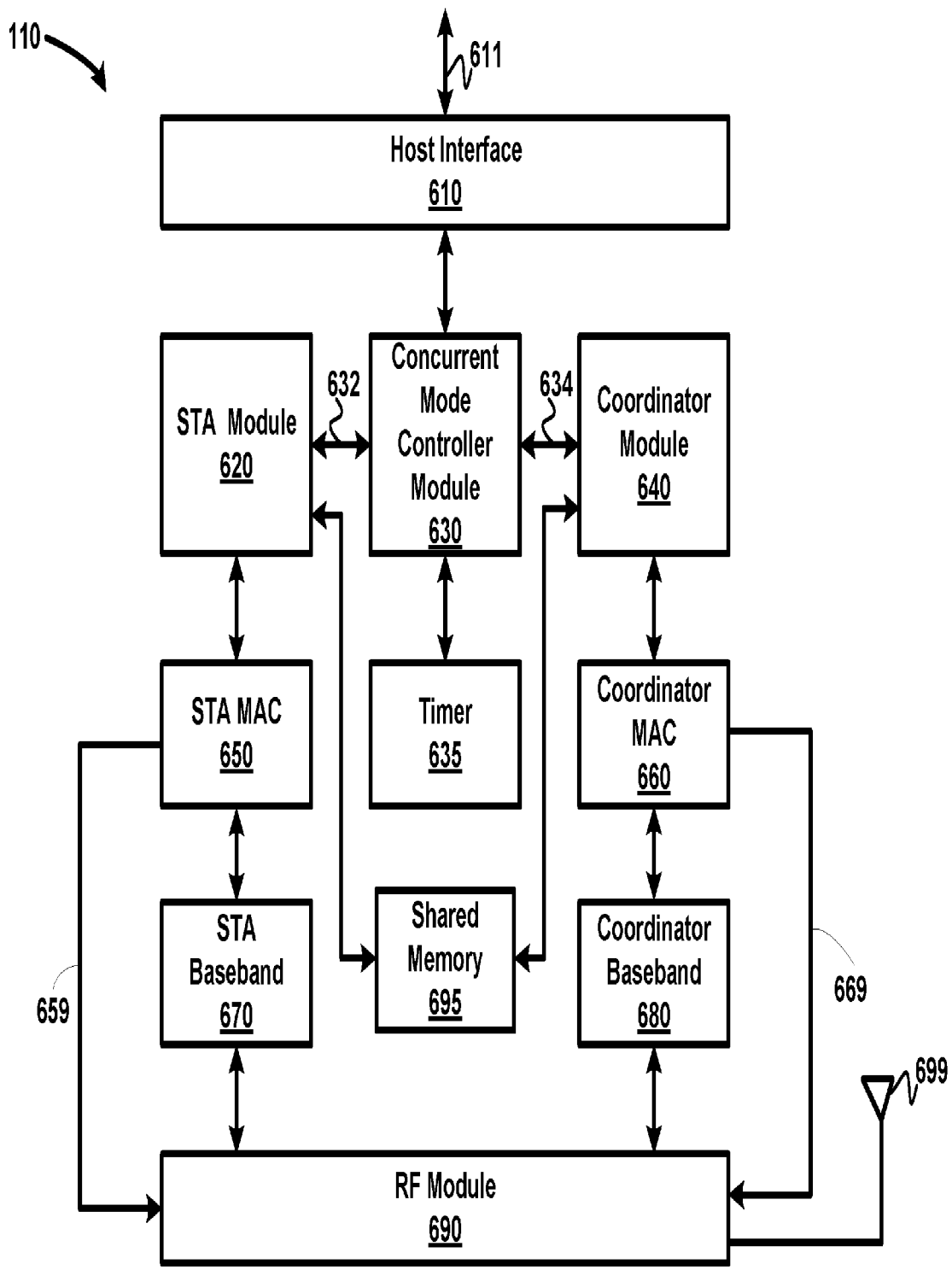
FIG. 6 is a diagram illustrating block-level implementation details of a border router, in an embodiment of the present disclosure.

FIG. 6 is a diagram illustrating block-level implementation details of border router 110, in an embodiment of the present disclosure. Border router 110 is shown containing host interface 610, STA module 620, STA MAC 650, STA baseband 670, coordinator module 640, coordinator MAC 660, coordinator baseband 680, RF module 690, antenna 699, concurrent mode controller module 630, timer 635, and shared memory 695. The combination of modules 620, 650 and 670 is termed herein as "STA chain". The combination of modules 640, 660 and 680 is termed herein as "coordinator chain".

When border router 110 operates as STA 110B, STA module 620 receives, from STA MAC 650, IP packets transmitted to STA 110B from AP 150. STA module 620 determines if the IP packets are destined for devices in mesh 160, and if so, stores the IP packets in shared memory 695 (for processing by coordinator module 640, as described below). STA module 620 retrieves from shared memory 695, packets stored therein by coordinator module 640 and destined for devices in internet 190. STA module 620 forwards the packets to STA MAC 650. In addition, STA module 620 may compute the parameters to be used for transmitting or receiving signals according to IEEE 802.11 standards, and provides the value of the parameters to STA MAC 650. The specific values of the parameters may be fixed, or be variable/configurable based on user inputs (provided via host interface 610, described below). The parameters may include security keys to be used for encryption and decryption of data sent to, or received from, AP 150, BSSID (Basic Service Set Identifier), etc. STA module 620 is deemed to include network layer operations for processing (e.g., forming and decoding) IP packets. In an embodiment, STA module 620 is implemented as corresponding software instructions executed by one or more processors.

STA MAC 650 performs medium access control operations to enable transmission and reception of frames according to IEEE 802.11 specification. STA MAC 650 encapsulates IP packets received for transmission from STA module 620 in corresponding layer-2 frames, and forwards the frames to STA baseband 670. STA MAC 650 receives frames from STA baseband 670, retrieves the IP packets encapsulated in the frames, and forwards the IP packets to STA module 620. In an embodiment, STA MAC 650 is implemented using a combination of software instructions and hardware blocks (primarily registers and queues). The software instructions form the data/management frames noted above, and store the frames in corresponding hardware queues contained in STA MAC 650. The software instructions also program the corresponding registers to effect channel access control mechanisms according to IEEE 802.11.

STA baseband 670 receives the data bits (or symbols) of frames from STA MAC 650, and modulates a carrier signal with the data bits/symbols. The modulated carrier signal represents a baseband signal according to IEEE 802.11 standard, and STA baseband 670 forwards the baseband signal to RF module 690. When receiving data from external systems, STA baseband 670 extracts data bits/symbols from a modulated carrier received via RF module 690, and forwards the data bits/symbols to STA MAC 650 for further processing.

When border router 110 operates as coordinator 110A, coordinator module 640 receives, from coordinator MAC 660, IP packets transmitted by its child nodes. Coordinator module 640 determines if the IP packets are destined for devices in internet 190, and stores the IP packets in shared memory 695. Coordinator module 640 retrieves from shared memory 695, IP packets stored therein by STA module 620 and which are destined for transmission to devices in mesh 160. Coordinator module 640 forwards the retrieved IP packets to coordinator MAC 660. In addition, coordinator module 640 may compute the parameters to be used when border router 110 operates as coordinator 110A according to coordinator (IEEE 802.15.4) standards. Coordinator module 640 provides the value of the parameters to coordinator MAC 660. The parameters include the IEEE 802.15.4 beacon interval to be used when operating in the first level of mesh 160 operates in beacon-enabled mode, the length of the contention access period (CAP), the length of the contention free period (CFP), etc. Various other parameters as applicable or required by the IEEE 802.15.4 standard may also be computed by coordinator module 640. Coordinator module 640 is deemed to include network layer operations for processing (e.g., forming and decoding) IP packets. In an embodiment, coordinator module 620 is implemented as corresponding software instructions.

Coordinator MAC 660 performs medium access control operations to enable transmission and reception of data according to coordinator IEEE 802.15.4 specification. Accordingly, coordinator MAC 660 forms data representing IEEE 802.15.4 beacons, and in conformance with the parameters received from coordinator module 640. Coordinator MAC 660 encapsulates IP packets received from coordinator module 640 in corresponding layer-2 frames, and forwards the frames to coordinator baseband 680. Coordinator MAC 660 receives frames from coordinator baseband 680, retrieves the IP packets encapsulated in the frames, and forwards the IP packets to coordinator module 620. In an embodiment, coordinator MAC 660 is implemented using a combination of software instructions and hardware blocks (primarily registers and queues). The software instructions form corresponding frames representing/containing beacons and data packets, and store the frames in corresponding hardware queues contained in coordinator MAC 660. The software instructions also program the corresponding registers to effect channel access control mechanisms according to IEEE 802.15.4.

Coordinator baseband 680 receives data bits (or symbols) from coordinator MAC 660, and modulates a carrier signal with the data bits/symbols. The modulated carrier signal represents a baseband signal according to IEEE 802.15.4 standard. Coordinator baseband 680 forwards the baseband signal to RF module 690. When receiving data bits/symbols from devices in mesh 160, coordinator baseband 680 extracts the data bits/symbols from a modulated carrier received via RF module 590, and forwards the data bits/symbols to coordinator MAC 660 for further processing.

RF module 690 is shared by the blocks corresponding to STA and coordinator in a time-multiplexed manner, as described above with respect to FIGS. 3A, 3B and 4. Though not shown, RF module 690 contains frequency up-converters and frequency down-converters. The up-converters translate the carrier frequency of the corresponding baseband signal to a higher frequency as specified by the corresponding specification (IEEE 802.11 or IEEE 802.15.4). The up-converted signal is transmitted on a wireless medium via antenna 699. The down-converters receive a 802.11 or 802.15.4 signal via antenna 699, and translate the signal to the corresponding lower (baseband) frequency. RF module 690 receives a control signal on path 659 to set the carrier frequency of the up-converted signal according to IEEE 802.11. RF module 690 receives a control signal on path 669 to set the carrier frequency of the up-converted signal according to IEEE 802.15.4.

The specific up-converted frequency (i.e., transmit and receive frequency at antenna 699) when operating as STA 110B may be selected from one of the bands allocated for WLAN, namely the 2.4 Giga Hertz (GHz), 3.6 GHZ, 5 GHz and 60 GHz frequency bands. The specific up-converted frequency (i.e., transmit and receive frequency at antenna 699) when operating as coordinator 110A device may be selected from one of the bands allocated for WPAN, namely 868.0-868.6 MHz band, 902-928 MHz band and 2400-2483.5 MHz band. The up-converters noted above may be implemented using local oscillators, mixers, low-pass filters and power amplifiers, as is well known in the relevant arts. The down-converters noted above may be implemented to include low-noise amplifiers, local oscillators, mixers, and low-pass filters, as is also known in the relevant arts. The control signals on paths 659 and 669 may be used to control the corresponding local oscillator frequencies to obtain the desired final carrier frequencies.

Timer 635 represents one or more hardware timers, which is/are programmable to generate one or more interrupts (provided to concurrent mode control module 630), for example, on expiry of corresponding count values written to it/them.

Concurrent mode controller module 630 schedules the STA chain and coordinator chain to operate in a time-multiplexed manner (in non-overlapping intervals, as described above with respect to FIGS. 3A, 3B and 4) to enable border router to operate both as STA 110B and coordinator 110A, as described in detail above. Concurrent mode controller module 630 may program timer 635 with corresponding count values to generate interrupts, based on which switching of operation of border router 110 as coordinator 110A and STA 110B device occurs.

Thus for example, with respect to FIG. 3A, concurrent mode controller module 630 may program timer 635 to generate an interrupt at t30. In response, concurrent mode controller module 630 either restores the data structures and register values representing the previously saved context of coordinator chain or initializes the context (if commencing operation after a power ON of border router 110). Concurrent mode controller module 630 programs timer 635 to generate an interrupt at t33. In interval t31-t33, border router 110 operates as coordinator 110A as described in detail above.

At t33, timer 635 generates an interrupt (as earlier programmed). In response, concurrent mode controller module 630 suspends the operation of coordinator chain (for example by writing into corresponding registers in coordinator MAC 660), and saves/store the context of the coordinator chain (data structures, register values, etc.) for later restoration. Following the context store of the coordinator chain, concurrent mode controller module 630 either restores the data structures and register values representing the previously saved context (data structures, register values, etc.) of STA chain or initializes the context (if commencing operation after a power ON of border router 110). Concurrent mode controller module 630 programs timer 635 to generate an interrupt at t34. In interval t33-t34, wireless device 140 operates as STA 110B as described in detail above. At t34, concurrent mode controller module 630 saves the context of the STA chain and restores the context of the coordinator chain, and the multiplexed operations as a coordinator and STA device is repeated. The context of STA chain is retrieved and restored via path 632. The context of coordinator chain is retrieved and restored via path 634.

Host interface 610 provides electrical and protocol interfaces to enable connection of border router 110 with an external device/system via path 611. The external system could, for example, be a computer. A user may provide configuration information to border router 110 via the computer. The configuration information may include the parameters noted above with respect to STA module 620 and coordinator module 640. In operating as STA 110B, the specific AP (AP 150) with which STA 110B is to associate may also be specified by a user via the computer or external device/system in general.

It should be further appreciated that a border can be enabled with the features described above as a desired combination of one or more of hardware, executable modules, and firmware. The description is continued with respect to an alternative view of the details of FIG. 6.

7. Digital Processing System

Figure 7:
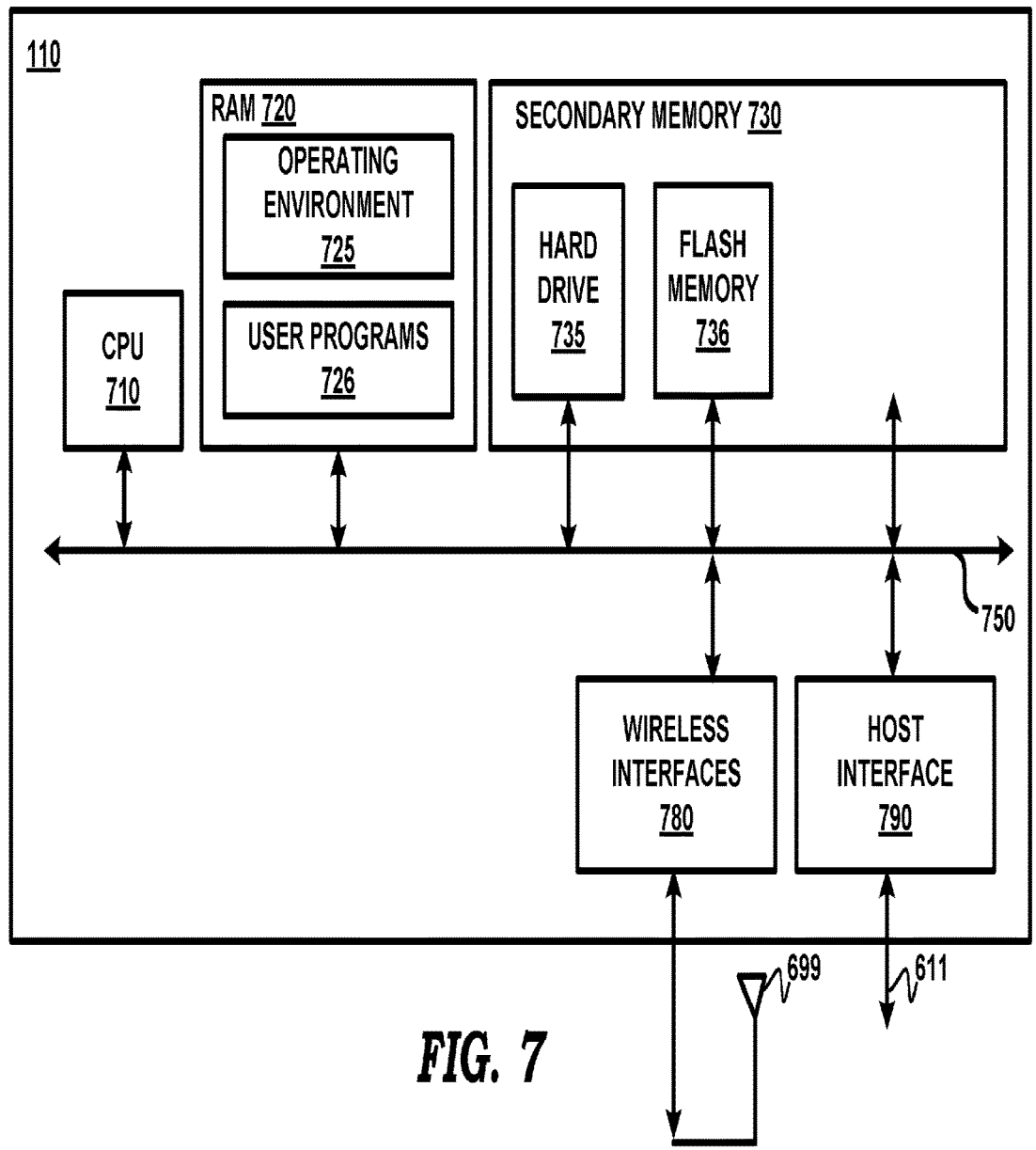
FIG. 7 is a block diagram illustrating the details of a border router in an alternative view.

FIG. 7 is a block diagram illustrating the details of border router 110 in an alternative view. Border router 110 may contain one or more processors such as a central processing unit (CPU) 710, random access memory (RAM) 720, secondary memory 730, wireless interfaces 780 and host interface 790. All the components may communicate with each other over communication path 750, which may contain several buses as is well known in the relevant arts.

CPU 710 may execute instructions stored in RAM 720 to provide several features of the present disclosure. CPU 710 may contain multiple processing units, with each processing unit potentially being designed for a specific task. Alternatively, CPU 710 may contain only a single general-purpose processing unit.

RAM 720 may receive instructions from secondary memory 730 (non-transitory/non-volatile machine readable medium) via communication path 750. RAM 720 is shown currently containing software instructions constituting operating environment 725 and/or other code/user programs 726. In addition to operating system 725, RAM 720 may contain other software programs such as device drivers, etc., which provide a (common) run time environment for execution of code/programs/applications (in the form of execution entities). RAM 720 includes shared memory 695 of FIG. 6.

Secondary memory 730 is shown containing hard drive 735 and flash memory 736. Secondary memory 730 stores data and software instructions (code), which enable border router 110 to provide several features in accordance with the present disclosure. Thus, secondary memory 730 may store software instructions representing modules 620, 630, 640, and the corresponding software portions of modules 650 and 660 of FIG. 6. The software instructions (and additionally configuration data) may either be copied to RAM 720 prior to execution by CPU 710, or may be executed directly from flash memory 736.

Host interface 790 corresponds to host interface 610 of FIG. 6. Wireless interface 780 represents the combination of modules 670, 680, 690 and the hardware portions of modules 650 and 660.

8. Conclusion

References throughout this specification to "one embodiment", "an embodiment", or similar language means that a particular feature, structure, or characteristic described in connection with the embodiment is included in at least one embodiment of the present invention. Thus, appearances of the phrases "in one embodiment", "in an embodiment" and similar language throughout this specification may, but do not necessarily, all refer to the same embodiment.

While various embodiments of the present invention have been described above, it should be understood that they have been presented by way of example only, and not limitation. Thus, the breadth and scope of the present invention should not be limited by any of the above-described embodiments, but should be defined only in accordance with the following claims and their equivalents.

What is claimed is:

1. A method performed in a wireless device, said method comprising:

receiving a sequence of packets in a first set of durations on a first wireless network according to a first wireless protocol;

forwarding said sequence of packets in a second set of durations on a second wireless network according to a second wireless protocol, wherein none of said first set of durations overlaps with any of said second set of durations, said first set of durations and said second set of durations being realized according to time division multiplexing, wherein said sequence of packets are received and forwarded by said wireless device using a single shared transceiver, wherein said first wireless protocol and said second wireless protocol are at layer-2 level, wherein said wireless device operates as a router at a layer-3 level in said first wireless network such that each of said sequence of packets comprises a corresponding layer-3 packet of a sequence of layer-3 packets, wherein a first IP packet of said sequence of layer-3 packets contains a destination IP address of a node located outside of said second wireless network, wherein a switch in said second wireless layer network receives said first layer-3 packet and forwards said first layer-3 packet on Internet to said node based on said destination IP address, wherein said first wireless protocol is according to IEEE 802.15.4 standards, wherein said second wireless protocol is according to IEEE 802.11 standards, wherein said switch is an access point (AP) of said second wireless network, wherein said layer-3 level is Internet protocol (IP) and wherein said wireless device operates as a border router in said IP network, wherein said wireless device operates as a wireless station (STA) in said second wireless network to perform said forwarding; and transmitting a set of signaling packets, wherein each of a set of first level nodes in a transmission range of said border router is designed to compute active durations and inactive durations based on said set of signaling packets, wherein said sequence of packets are received in said active durations such that said first set of durations are contained in said active durations, wherein said sequence of packets are forwarded in said inactive duration such that said second set of durations are contained in said inactive durations.

2. The method of claim 1, wherein each of said set of signaling packets comprises a corresponding beacon of a set of beacons, wherein said set of beacons are transmitted with a fixed beacon interval between transmission of successive beacons, wherein each beacon signals the beginning of an active duration in a corresponding beacon interval between the beacon and the immediately following beacon, wherein each of a set of first level nodes in a transmission range of said border router is designed to compute an active duration and an inactive duration in each of said beacon intervals.

3. The method of claim 2, wherein said set of first level of nodes contains a first router which is available to receive packets from lower level nodes in the entire duration of said beacon intervals.

4. The method of claim 1, wherein each of said signaling packets is transmitted asynchronously and contains a data field indicating start of an active duration or an inactive duration.

5. The method of claim 4, wherein said data field is contained in payload portion of a layer-4 packet.

6. A non-transitory machine readable medium storing one or more sequences of instructions for operating a wireless device, wherein execution of said one or more instructions by one or more processors contained in said wireless device enables said wireless device to perform the actions of:

receiving a sequence of packets in a first set of durations on a first wireless network according to a first wireless protocol;

forwarding said sequence of packets in a second set of durations on a second wireless network according to a second wireless protocol, wherein none of said first set of durations overlaps with any of said second set of durations, said first set of durations and said second set of durations being realized according to time division multiplexing, wherein said sequence of packets are received and forwarded by said wireless device using a single shared transceiver, wherein said first wireless protocol and said second wireless protocol are at layer-2 level, wherein said wireless device operates as a router at a layer-3 level in said first wireless network such that each of said sequence of packets comprises a corresponding layer-3 packet of a sequence of layer-3 packets, wherein a first IP packet of said sequence of layer-3 packets contains a destination IP address of a node located outside of said second wireless network, wherein a switch in said second wireless layer network receives said first layer-3 packet and forwards said first layer-3 packet on Internet to said node based on said destination IP address, wherein said first wireless protocol is according to IEEE 802.15.4 standards, wherein said second wireless protocol is according to IEEE 802.11 standards, wherein said switch is an access point (AP) of said second wireless network, wherein said layer-3 level is Internet protocol (IP) and wherein said wireless device operates as a border router in said IP network, wherein said wireless device operates as a wireless station (STA) in said second wireless network to perform said forwarding; and transmitting a set of signaling packets, wherein each of a set of first level nodes in a transmission range of said border router is designed to compute active durations and inactive durations based on said set of signaling packets, wherein said sequence of packets are received in said active durations such that said first set of durations are contained in said active durations, wherein said sequence of packets are forwarded in said inactive duration such that said second set of durations are contained in said inactive durations.

7. The non-transitory machine readable medium of claim 6, wherein each of said set of signaling packets comprises a corresponding beacon of a set of beacons, wherein said set of beacons are transmitted with a fixed beacon interval between transmission of successive beacons, wherein each beacon signals the beginning of an active duration in a corresponding beacon interval between the beacon and the immediately following beacon, wherein each of a set of first level nodes in a transmission range of said border router is designed to compute an active duration and an inactive duration in each of said beacon intervals.

8. The non-transitory machine readable medium of claim 7, wherein said set of first level of nodes contains a first router which is available to receive packets from lower level nodes in the entire duration of said beacon intervals.

9. The non-transitory machine readable medium of claim 6, wherein each of said signaling packets is transmitted asynchronously and contains a data field indicating start of an active duration or an inactive duration.

10. A wireless device comprising:
a processor block and a memory, said memory to store instructions which when retrieved and executed by said processor block causes said wireless device to perform the actions of:

receiving a sequence of packets in a first set of durations on a first wireless network according to a first wireless protocol;

forwarding said sequence of packets in a second set of durations on a second wireless network according to a second wireless protocol, wherein none of said first set of durations overlaps with any of said second set of durations, said first set of durations and said second set of durations being realized according to time division multiplexing, wherein said sequence of packets are received and forwarded by said wireless device using a single shared transceiver, wherein said first wireless protocol and said second wireless protocol are at layer-2 level, wherein said wireless device operates as a router at a layer-3 level in said first wireless network such that each of said sequence of packets comprises a corresponding layer-3 packet of a sequence of layer-3 packets, wherein a first IP packet of said sequence of layer-3 packets contains a destination IP address of a node located outside of said second wireless network, wherein a switch in said second wireless layer network receives said first layer-3 packet and forwards said first layer-3 packet on Internet to said node based on said destination IP address, wherein said first wireless protocol is according to IEEE 802.15.4 standards, wherein said second wireless protocol is according to IEEE 802.11 standards, wherein said switch is an access point (AP) of said second wireless network, wherein said layer-3 level is Internet protocol (IP) and wherein said wireless device operates as a border router in said IP network, wherein said wireless device operates as a wireless station (STA) in said second wireless network to perform said forwarding; and transmitting a set of signaling packets, wherein each of a set of first level nodes in a transmission range of said border router is designed to compute active durations and inactive durations based on said set of signaling packets, wherein said sequence of packets are received in said active durations such that said first set of durations are contained in said active durations, wherein said sequence of packets are forwarded in said inactive duration such that said second set of durations are contained in said inactive durations.

11. The wireless device of claim 10, wherein each of said set of signaling packets comprises a corresponding beacon of a set of beacons, wherein said set of beacons are transmitted with a fixed beacon interval between transmission of successive beacons, wherein each beacon signals the beginning of an active duration in a corresponding beacon interval between the beacon and the immediately following beacon, wherein each of a set of first level nodes in a transmission range of said border router is designed to compute an active duration and an inactive duration in each of said beacon intervals.

* * * * *